April 14, 1970  O. J. ADLHART  3,506,494
PROCESS FOR PRODUCING ELECTRICAL ENERGY UTILIZING
PLATINUM-CONTAINING CATALYSTS
Filed Dec. 22, 1966

*INVENTOR.*
OTTO J. ADLHART
BY Robert S. Hora
ATTORNEY

United States Patent Office 3,506,494
Patented Apr. 14, 1970

3,506,494
PROCESS FOR PRODUCING ELECTRICAL
ENERGY UTILIZING PLATINUM-CONTAINING CATALYSTS
Otto J. Adlhart, Newark, N.J., assignor to Engelhard Industries, Inc., Newark, N.J., a corporation of Delaware
Continuation-in-part of application Ser. No. 295,772, July 17, 1963. This application Dec. 22, 1966, Ser. No. 603,947
Int. Cl. H01m 27/04; B01j 11/06
U.S. Cl. 136—86                               6 Claims

ABSTRACT OF THE DISCLOSURE

Electrical energy is produced in a fuel cell which utilizes a carbon containing fuel and which has as the anode catalyst a ternary alloy consisting essentially of 30–90% platinum, 5–40% ruthenium, and 5–30% of a third different metal, e.g. gold, rhenium, tantalum, tungsten, molybdenum, or rhodium. Such fuel cells have improved power output, which is attributable to the anode catalysts.

This application is a continuation-in-part of Ser. No. 295,772, now abandoned, filed July 17, 1963. The invention relates to the production of electrical energy employing fuel cells having new and improved fuel electrodes.

Fuel cells, which are devices for the direct conversion of a fuel to electrical energy, are well known. The cells basically are composed of an oxidizer electrode (cathode), a fuel electrode (anode) and an electrolyte. Organic fuels have been used heretofore as reactant in fuel cells. Exemplary of such fuels are normally gaseous hydrocarbons, for instance methane and propane, and oxygenated hydrocarbons, for instance methanol.

However the use of these organic fuels at the anode with acid or neutral electrolytes and with certain catalysts at the anode, for instance platinum alone or ruthenium alone, has resulted in a strong anodic polarization under load, i.e. during current withdrawal. In addition to the platinum alone or ruthenium alone showing an inadequate level of catalytic activity at the anode, the life of such catalysts has been unduly short. The result has been a severe reduction in the overall power output of fuel cells having such electrodes.

It is known in the art, particularly in an article by G. Cohn in Proceedings 15th Annual Power Sources Conference, pages 12–16, "Fuel Cell Materials," that combinations of metals such as Pt and Ru, Pd, Au or another metal, when used as catalyst for fuel cell cathodes provides no particular benefit. The polarization loss of the more active component was in no instance found in the art to be less than the loss obtained by the combination of metals. Instead, the art indicates that the potentials of the cells tested varied in rough proportion to the contents of less active and more active component, no promoter action being found. The single exception mentioned was found to give poorer results with further testing. The art accordingly teaches that substitution of a less active component for some of a more active component results in an electrode activity which is poorer than the activity of an equal amount of the more active component alone.

The activity of an electrode may be regarded as being inversely proportional to electrode polarization, whereas the polarization is the difference between the actually measured potential and a theoretical potential. The greater activity of a combination of metal catalysts is then manifested as a lower measured potential.

Surprisingly, the applicant has found that use of the alloys described on fuel cell anodes in accordance with the present invention provides a particularly beneficial result. Polarization loss is decreased substantially over that indicated by the Cohn art mentioned above. The ternary catalyst electrodes of the present invention permit a significant and substantial reduction in energy lost by polarization.

It has been found in accordance with the present invention that the strong anodic polarization occurring during withdrawal with the prior art fuel cells previously mentioned, is materially reduced or minimized by the method of this invention utilizing the new and improved fuel electrode. This new and improved fuel electrode comprises as catalyst an alloy of platinum, ruthenium and another different metal from principal quanta or periods 5 and 6 of Groups IB, VB, VIB, VIIB or VIII of the Periodic Table. Use of such electrode is a meritorious improvement in this art by reasons of providing a materially higher level of catalytic activity and having an appreciable longer life than prior art electrodes.

The other metal from the groups of the Periodic Table previously disclosed which is combined with the platinum and ruthenium as an alloy can be either gold, tantalum, tungsten, rhenium, palladium, molybdenum, silver, niobium, rhodium, osmium or iridium. The Periodic Table is that obtained from Merck & Co., Inc., Rahway, New Jersey, revised 1955, entitled "Periodic Chart of the Elements" (based on "Fundamental Chemistry," 2nd ed., by H. G. Deming).

Throughout the specification and claims, the term "alloy" is used in the broad sense accepted by the art, e.g. the "Encyclopaedic Dictionary of Physics," Pergamon Press, 1961, as a macroscopically homogeneous mixture of metals. It will be appreciated therefore that the alloys of platinum, ruthenium and the third metal which are employed herein include intimate mixtures of the metals which may either be immiscible, or in the form of mixed crystals or solid solutions or actual chemical compounds. Furthermore, the constituents of such intimate mixtures, either as initially prepared or during operation of the fuel cells, may be partially in the oxidized form.

The combination of the platinum, ruthenium, and the other different metal as catalyst at the fuel electrode or anode is important herein for the reason such combination provides an appreciably higher level of catalytic activity at the fuel electrode for a considerably longer time than when a single platinum group metal, such as platinum, is the anode catalyst. Secondly, it is essential that the platinum, ruthenium and third metal be alloyed together instead of being merely a non-alloyed mechanical mixture. Mechanically mixing the three components does not result in an increase in catalytic activity; in fact, the performance of the mixture is generally inferior to the most active single component of the mixture.

The cathode, i.e. oxidizer electrode, can be a catalytic or non-catalytic electrode. When a catalytic cathode is utilized, a platinum group metal, for instance platinum per se or palladium per se can be deposited on the support. A non-catalytic cathode can be employed, if desired, for instance in a redox system.

The process for production of electrical energy in accordance with this invention comprises, in its broader aspects, contacting a catalytic fuel electrode of a fuel cell with a fuel, the fuel electrode comprising as catalyst an alloy of platinum, ruthenium and one of the other metals previously disclosed and being in contact with an electrolyte, and contacting an oxidizer electrode of the cell with an oxidizer, the oxidizer electrode also bein gin contact with the electrolyte. The fuel, for instance a normally gaseous straight chain hydrocarbon, can be contacted in gaseous or liquid phase with the electrolyte by passage within a gas-pervious fuel electrode of this invention comprising the alloy of platinum, ruthenium and the other metal on the porous supporting substrate. Alternatively the fuel can be dissolved in the electrolyte, for example methanol dissolved in sulfuric acid electrolyte, wherein it contacts the catalytic fuel electrode. The oxidizer, for instance an oxygen-containing gas, can be contacted with the electrolyte by passage within a gas-pervious oxidizer electrode. Consequently, the fuel reacts electrochemically with release of electrons which are carried off by electrically conductive means and an external circuit, and the oxidizer reacts electrochemically at the oxidizer electrode with electrons supplied from the external circuit, so that a continuous electric current results.

The alloys of this invention are substantially ternaries, although it is noted that other materials may be present. They may be prepared by a variety of methods. One preparation method is by melting the platinum, ruthenium and one of the other metals previously disclosed in proportions corresponding to those desired in the product alloy, together with a fourth component usually present as the major or primary constituent in the melt, the fourth component being readily leachable out of the resulting alloy, for instance aluminum or silicon. The melting of the four components can be done in a gas-fired or electrical furnace. The resulting alloy, after removal from the furnace and cooling solidification, is treated with caustic, for instance potassium or sodium hydroxide aqueous solution, to leach or dissolve out the aluminum, for example by treatment with a 10% caustic solution at 80° C. The alloy is obtained by this technique as a powder.

Alternatively, certain ternary alloys of this invention can be prepared by heating to boiling an aqueous solution of an alkali metal formate, for instance sodium formate, as reducing agent, typically a solution of 10% sodium formate concentration, plus sufficient acid, for instance HCl, to maintain the solution at an acid pH. A soluble compound of platinum, of ruthenium and of the other metal, for instance chloroplatinic acid

($H_2PtCl_6$)

ruthenium trichloride ($RuCl_3$), and the chloride, for example, palladium ($PdCl_2$), rhenium ($ReCl_3$), or gold ($AuCl_3$), depending on which ternary alloy is desired, are then added to the solution. While not known with certainty, it is believed that as a result of the acid pH, metallic ruthenium, platinum and the third metal are precipitated out of solution and at a sufficiently slow rate to alloy during precipitation. A basic pH of the solution is preferably avoided as this results in the three metals being precipitated at too fast a rate, with the result there is little or no alloying of the three metals.

A third method for preparing ternary alloys of this invention is similar to the last-mentioned procedure except that instead of formate ion, a suspension of finely divided aluminum metal, for instance powdered aluminum metal, is used as the reductant.

The catalyst of this invention can be either unsupported or supported on a suitable substrate. When unsupported, it can be in the form of a self-sustaining disc or sheet formed by compacting a mass of the alloy particles in a die by application of pressure. When supported, the alloy can be applied and adhered to the surface of metallic structures such as sheets, grids or other porous structures or non-metallic structures such as, for instance, structures of carbon, graphite, plastics and the like. One form of such supported alloy catalyst is an intimate mixture of Pt, Ru, and the third metal as hereinbefore discussed, dispersed on a high surface carrier, for example activated carbon powder. Such alloy on activated carbon powder is then adhered to a structural substrate. The surface area of the carrier is typically 50–1500 m.²/g. In the case of a cell employing a quasi-solid electrolyte, such as an ion exchange membrane, the catalyst may be imbedded in the surface of such electrolyte.

In one embodiment for preparing the supported alloy catalyst, the alloy is applied and adhered to the support in powder form. When "Teflon" is the supporting substrate, the alloy powder is pressed into the surface of the "Teflon" at normal temperautre by means of a suitable press, for instance a hydraulic press, to thereby adhere the powder particles to the support. When an ion exchange membrane fabricated of, for instance polystyrene sulfonic acid is the support, the alloy powder is pressed into the membrane surface to adhere the particles to such supoprt with the membrane surface maintained at an elevated temperature, suitably about 100° C.

In another embodiment for preparation of the supported alloy catalyst, the ternary alloy is applied and adhered as anode catalyst to one side or face of an ion exchange membrane previously treated with electrolyte, by pressing the alloy powder particles into the surface of the membrane by means of a hydraulic press. A cathode catalyst such as one of the cathode catalysts previously disclosed herein is applied and adhered to the opposite face of the membrane in similar manner. Alternatively, a portion of the membrane may be contacted with electrolyte, for instance by immersing such portion in a sulfuric acid electrolyte, so that the entire membrane is wetted with electrolyte. In operation water is added or removed to maintain the electrolyte concentration. With this type of catalytic anode and cathode and electrolyte, separate fuel and oxidizer supply conduits supply respectively the fuel to the anode catalyst and the oxidizer, for instance the oxygen-containing gas, to the cathode catalyst. Suitable electrically conductive members, for instance platinum gauze sheets, will contact the anode catalyst layer and cathode catalyst layer respectively for collection and withdrawal of electric current.

The fuel may be a normally gaseous, liquid or solid carbon containing fuel such as a hydrocarbon and includes acyclic and cyclic aliphatic hydrocarbons including paraffinic, olefinic and acetylenic hydrocarbons, naphthenes, and aromatic hydrocarbons. Exemplary of such fuels are methane, natural gas, ethane, propane, butane, pentane, hexane, a naphtha light ends $C_5$–$C_7$ fraction, a gasoline fraction, a kerosene fraction, liquefied petroleum gas, cyclobutane, cyclopropane, cyclopentane, cyclohexane, ethylene, propylene, acetylenes and benzene. The preferred fuel is a $C_1$–$C_{20}$ straight chain alkane hydrocarbon. Other carbon containing fuels that may be utilized are oxygenated hydrocarbons, for instance alcohols, e.g. methanol, aldehydes, e.g. formaldehyde, organic acids, e.g. formic acid, carbon monoxide, and the above fuels and hydrogen, such as a mixture of hydrogen and carbon monoxide as in reformer gas, and hydrogen and methanol, methane or ethylene. Large organic molecules may also be very favorable carbon containing fuels in accordance with this invention, provided the fuel can be supplied adequately to the anode catalyst surface. Exemplary of such large organic molecules are long chain hydrocarbons, fatty acids, fatty acid esters, and sugars.

The alloys of this invention contain, by weight, about 20–95 percent of platinum, about 3–75 percent of ruthenium and about 2–40 percent of the other different metal previously disclosed. It is preferable to employ 30–90 percent, 5–40 percent and 2–30 percent of these metals, respectively.

The electrolyte utilized is preferably an acid electrolyte, for instance aqueous sulfuric acid solution, e.g. aqueous sulfuric acid solution of 5% to 80% by weight concentration, or aqueous phosphoric acid solution of similar concentration. Other electrolytes that are satisfactory are electrolytes containing no free base or substantially devoid of free base, for instance sulfates, phosphates and perchlorates of alkali metals and alkali earth metals.

The method of this invention may be operated at ambient conditions but preferably at elevated temperatures in the range of about 50° C.–300° C. Sufficient heat for operation of the cells is usually provided by some polarization unavoidably occurring therein. Heat may be supplied from an outside source for start-up and, if necessary, during the course of the cell operation, for instance by steam supplied to a suitable steam jacket. The temperature of the cell may be controlled, for instance, by means of the amount of insulation material utilized, or of circulation by cooling air or other cooling gas about the cell.

Reference is now made to the accompanying drawings wherein.

Figure 1:
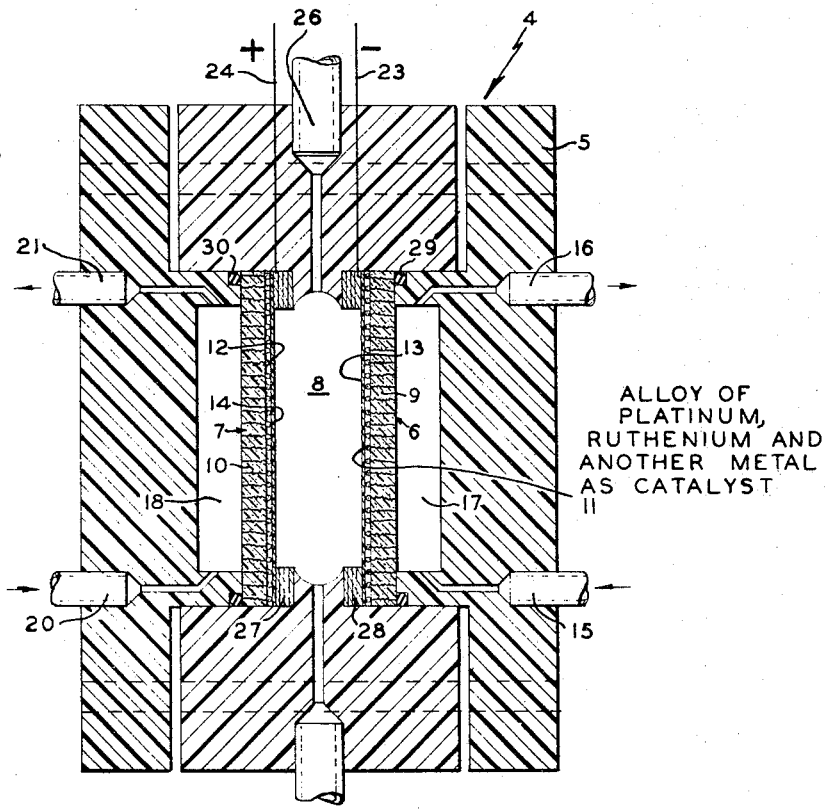
FIGURE 1 is a longitudinal section through a fuel cell of this invention.

Referring to FIGURE 1, fuel cell 4 comprises container 5 of "Teflon" or other material of low electrical conductivity, electrodes 6 and 7 of opposing polarity therein and respectively the fuel electrode and oxidizer electrode, and liquid electrolyte 8, preferably an acid electrolyte, contacting opposed surfaces of electrodes 6 and 7. Fuel electrode 6 is gas-pervious and made up of a porous substrate or support 9, for instance a sheet of porous "Teflon" sponge with permeable catalyst layer 11 of the alloy of this invention of platinum, ruthenium and the other metal adhered to the support. Oxidizer electrode 7 is also gas-pervious and has porous substrate 10 of a sheet of porous "Teflon" sponge with permeable catalyst layer 12 of platinum per se adhered to the support. In addition to the catalyst being adhered to the exterior surface of supports 9 and 10 of electrodes 6 and 7, some of the catalyst is on the walls defining accessible pores of the porous supports of substrate 9 and 10. A three phase boundary of catalyst, electrolyte and gaseous fuel results in the pores of substrate 9 of fuel electrode 6, where the catalyst surface contacts the menisci of the electrolyte and the gaseous fuel. Single ply platinum gauze sheets 13 and 14 contact catalyst layers 11 and 12 respectively for collection and withdrawal of electric current. The connection to the conventional reference electrode (not shown) is designated at 26. Annular members 27 and 28 of gold and O-rings 29 and 30 of neoprene rubber serve to respectively maintain the gauze sheets 14 and 13 in contact with the catalyst layers and to seal the assembly.

Fuel inlet and outlet 15 and 16 respectively enable supply of fuel in gaseous form into anode compartment 17 and the outflow of gaseous reaction products from such compartment.

The oxidizer is introduced into cathode compartment 18 through inlet 20 and the cathode effluent evolves through outlet 21. Exemplary of the oxidizer is air, oxygen-enriched air, or oxygen per se.

Figure 2:
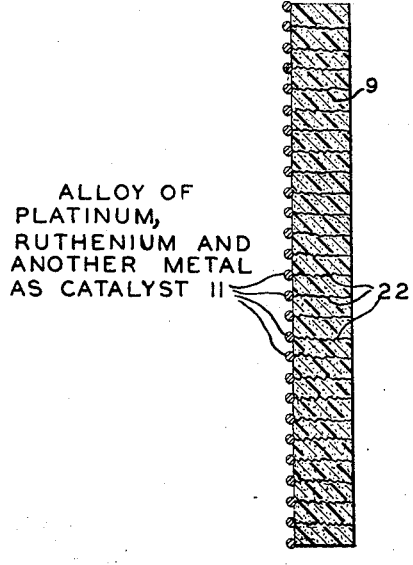
FIGURE 2 is an enlarged section through a fuel electrode of this invention.

One fuel electrode useful according to this invention is shown in more detail in FIGURE 2. Pores 22 of porous supporting substrate 9 communicate opposite sides of support 9. The alloy catalyst of this invention is supported on substrate 9 as a gas—and liquid—permeable layer 11 of powder particles with some of the catalyst particles on the walls defining the accessible pores of porous substrate 9 as previously disclosed herein. A current collecting and withdrawal member such as the platinum gauze sheet 13 shows in FIGURE 1 will contact catalyst layer 11 for the purpose stated.

Electrically conductive elements 23 and 24 are connected to the upper portion of the platinum gauze current collectors 13 and 14 respectively. Conductive elements 23 and 24 are connected in an external circuit with a suitable resistance, for instance an incandescent lamp (not shown), and the flow of current in such circuit due to the flow of electrons resulting from the electro-chemical reaction within the fuel cell, results in the lamp being energized and lighting up.

A variety of electrode catalyst combinations have been evaluated with fuel cells or by a half cell evaluation procedure. The latter is especially convenient for rapid and unambiguous determination of difference in anode polarization, as any limitations due to cathode polarization or resistance polarization are eliminated. Such a half cell evaluation procedure is described in J. Electro-chem. Soc. 109, 553 (1962). The half cell method used to evaluate the catalysts of this invention was similar except that a Ag/AgCl reference electrode was used instead of the calomel electrode.

The following comparative test data evidences the improvement in activity provided according to this invention by an alloy of platinum, ruthenium and the other metal as catalyst at the anode or fuel electrode of a fuel cell, over the use of platinum alone or ruthenium alone and also rhenium alone as such catalyst. The electrolyte in all tests was 2 N sulfuric acid containing as fuel 2% methanol, and the cells were operated at a temperature of about 95° C. The results follow:

TABLE I

| Test | Catalyst Composition, weight percent | Anode Potential in volts vs. Standard Hydrogen Electrode—Current Density, ma./cm.$^2$ | | | | |
|---|---|---|---|---|---|---|
| | | 0 | 5 | 20 | 50 | 100 |
| 1 | Pt | .16 | .37 | .44 | .49 | .57 |
| 2 | Pt 75, Ru 20, Au 5 | .12 | .24 | .29 | .33 | .37 |
| 3 | Pt 70, Ru 20, Au 10 | .10 | .22 | .27 | .31 | .37 |
| 4 | Pt 60, Ru 20, Au 20 | .08 | .20 | .24 | .29 | .35 |
| 5 | Pt 50, Ru 20, Au 30 | | | .25 | .30 | .34 |
| 6 | Ru | .31 | .46 | .59 | | |
| 7 | Pt 60, Ru 20, Pd 20 | .12 | .23 | .28 | .33 | .38 |
| 8 | Pt 70, Ru 20, Re 10 | .11 | .17 | .23 | .28 | .34 |
| 9 | Pt 33, Ru 33, Re 34 | | | .25 | .33 | .42 |
| 10 | Pt 50, Ru 20, Re 30 | | | .27 | .34 | .43 |
| 11 | Pt 60, Ru 20, W 20 | .10 | .20 | .25 | .30 | .34 |
| 12 | Pt 60, Ru 20, Ta 20 | .10 | .19 | .24 | .29 | .34 |
| 13 | Pt 70, Ru 15, Mo 15 | .08 | .16 | .23 | .30 | .37 |
| 14 | Re | .28 | .35 | .44 | .57 | |

The anode potentials in Table I and also in Table II and other data hereinafter disclosed, are compared with the potential of a standard hydrogen electrode. As evidenced in Table I, the ternary alloys of this invention containing platinum, ruthenium and the other metal of Tests 2–5 and 7–13 gave superior results from an activity standpoint to the platinum alone of Test 1, the ruthenium alone of Test 6 and the rhenium alone of Test 14. And such improvement was provided at open circuit to current withdrawal at current densities of 5, 20, 50 and 100 ma./cm.$^2$. The actual energy loss or polarization is approximated by deducting +.07 volt, the methanol potential under the conditions, from the data in Table I. Also, the results provide surprising and substantial improvement over the results indicated by the earlier mentioned Cohn art which referred to cathode catalysts, since said art teaches that the activity of no combination would be expected to exceed that of the most active component. The art accordingly indicates that no voltage for an alloy lower than that for Pt, Ru or Re alone would be expected. For instance, according to that art, the Re potential at 5 ma./cm.$^2$ of 0.35 volt would be the lowest anticipated, but Test 8 in fact gave a potential of 0.17 volt. Similarly, at 20 ma./cm.$^2$, a potential no better than the Pt or Re potential of 0.44 volt would be expected, but the Test 9 potential was 0.25 volt.

The comparative test data of Table II evidences the improvement in life provided by alloy of platinum, ruthenium and the other metal of this invention as anode catalyst over the use of platinum alone as such catalyst. The fuel and conditions for the Table II runs were the same as in those of Table I except the current density was 20 ma./cm.$^2$ in all the Table II runs. The results follow:

TABLE II

| Test | Catalyst Composition, weight percent | Time Under Load, hours | Anode Potential vs. Standard Hydrogen Potential, volts |
|---|---|---|---|
| 1 | Pt | 0 | .40 |
| 2 | Pt | 25 | .42 |
| 3 | Pt | 50 | .44 |
| 4 | Pt | 100 | .49 |
| 5 | Pt | 150 | .52 |
| 6 | Pt | 200 | .60 |
| 7 | Pt | 250 | .60 |
| 8 | Pt 60, Ru 20, Au 20 | 0 | .26 |
| 9 | Pt 60, Ru 20, Au 20 | 25 | .27 |
| 10 | Pt 60, Ru 20, Au 20 | 50 | .27 |
| 11 | Pt 60, Ru 20, Au 20 | 100 | .28 |
| 12 | Pt 60, Ru 20, Au 20 | 150 | .28 |
| 13 | Pt 60, Ru 20, Au 20 | 200 | .29 |
| 14 | Pt 60, Ru 20, Au 20 | 250 | .30 |

The data of the foregoing Table II evidences the superior results and material improvement in life provided by the ternary alloy catalyst of this invention of Tests 8–14, over the platinum alone of Tests 1–7. Even after 250 hours under load, the anode potential provided by the ternary alloy of Test 14 was only .30 volt vs. standard hydrogen electrode while that provided by the Pt alone of Test 7 was .60 volt vs. standard hydrogen electrode.

The ternary alloys of this invention also showed improvement over binary alloys containing only ruthenium and platinum. At current density of 50 ma./cm.$^2$, a ternary alloy as anode catalyst containing, by weight, 20% Ru, 60% Pt and 20% Au showed an increase in anodic polarization of only 25 millivolts after 250 hours with potential increasing in this period from .300 volt to .325 volt vs. standard hydrogen electrode. The cell was operated at 90° C., the electrolyte was 2 N sulfuric acid, and the fuel was methanol. However, under similar operating conditions but after only 4 days time, a binary alloy containing, by weight, 80% Pt and 20% Ru showed an increase in anodic polarization of 140 millivolts with the potential increasing from .31 volt to .45 volt vs. standard hydrogen electrode.

Another advantage of certain ternary alloys of this invention over the Pt–Ru binary alloys is in resistance to inhibition by small amounts of HNO$_3$ in the electrolyte. It may be desirable to have HNO$_3$ or other cathodic depolarizers present to reduce cathodic depolarization, but a problem is that such cathodic depolarizer may reach the anode, increasing solubility of the anode metal or inhibiting its catalytic activity. With an 80% Pt–20% Ru alloy at the anode, and 2 N H$_2$SO$_4$ electrolyte containing 0.2% by volume HNO$_3$ and 2% by volume methanol fuel in the electrolyte, operation at 90° C. and 50 ma./cm.$^2$ increased the anode potential versus a standard hydrogen electrode in a few minutes from .29 volt to .53 volt. In an experiment with the 60% Pt, 20% Ru, 20% Au alloy, which was comparative except that 20 ma./cm.$^2$ current was drawn from the cell, operation for 250 hours resulted in increase of anode voltage only from .27 volt to .32 volt.

The 60% Pt, 20% Ru, 20% Au anode catalyst was tested as previously described with various organic fuels at various current densities. Comparative results were determined for the fuels methanol, formic acid, ethylene glycol, and dimethyl hydrazine. Results follow in Table III.

TABLE III

| Fuel, Catalyst | Potential in Volts vs. Standard Hydrogen Electrode—Current Density, ma./cm$^2$ | | | | |
|---|---|---|---|---|---|
| | 0 | 6 | 20 | 50 | 100 |
| Methanol: | | | | | |
| 60% Pt, 20% Ru, 20% Au | .08 | .20 | .25 | .30 | .34 |
| Pt | .16 | .39 | .45 | .50 | .57 |
| Formic acid: | | | | | |
| 60% Pt, 20% Ru, 20% Au | .12 | .25 | .20 | .32 | .36 |
| Pt | | .26 | .33 | .40 | .54 |
| Ethylene glycol: | | | | | |
| 60% Pt, 20% Ru, 20% Au | .14 | .27 | .30 | .35 | .40 |
| Pt | | .43 | .47 | .50 | .50 |
| Dimethyl hydrazine: | | | | | |
| 60% Pt, 20% Ru, 20% Au | .37 | .41 | .43 | .56 | |
| Pt | .37 | .55 | .61 | | |

It will be seen that significantly lower polarization occurs at the anode with the ternary alloy anode catalyst than with the Pt alone as anode catalyst and with all the fuels mentioned, especially at high current density. The cells were operated at a pressure of about 100 p.s.i.g.

Additional tests were performed using fuel electrodes having as catalyst either platinum or platinum—90%, ruthenium—5%, rhodium—5% by weight. Catalyst loading ranged between 4.3 and 6 mg./cm.$^2$. The electrolyte was 30% sulfuric acid. Half cell tests using a standard hydrogen electrode were employed. Two fuels, each representative of reformer gases were used.

TABLE IV

Volume percent

| | Fuel A | Fuel B |
|---|---|---|
| H$_2$ | 72.5 | 67 |
| CO | 2.0 | 13 |
| CO$_2$ | 21.3 | 15 |
| CH$_4$ | 4.2 | 5 |

The results of the tests are as follows:

TABLE V

[Anode potential in volts vs. standard hydrogen electrode*]

| Test No. | Fuel | Catalyst Composition (weight percent) | Current Density in ma./sq. cm. | | | | | | |
|---|---|---|---|---|---|---|---|---|---|
| | | | 0 | 20 | 27 | 40 | 53 | 67 | 100 |
| 1 | A | 90 Pt, 5 Ru, 5 Rh | −.015 | | .006 | .017 | .029 | .042 | .113 |
| 2 | A | Pt | .007 | .119 | | | .295 | .318 | .353 |
| 3 | B | 90 Pt, 5 Ru, 5 Rh | −.011 | | .025 | .064 | .155 | .268 | .365 |
| 4 | B | Pt | .010 | .308 | | | .391 | .411 | .448 |
| 5 | A | 90 Pt, 5 Ru, 5 Rh | −.017 | | | .169 | .293 | .322 | .356 |
| 6 | A | Pt | −.004 | .328 | | | .390 | .403 | |

*Tests 1–4 were carried out at 90° C. Tests 5 and 6 were performed at 60° C.

It will be obvious to those skilled in the art that many modifications may be made within the scope of the present invention without departing from the spirit thereof and this invention includes all such modifications.

What is claimed is:

1. A process for the production of electrical energy, which comprises contacting a catalytic fuel electrode of a fuel cell with a carbon-containing fuel, the fuel electrode comprising as catalyst a ternary alloy of 30–90 weight percent platinum, 5–40 weight percent ruthenium and 5–30 weight percent of the ternary component, said component being gold, rhenium, tantalum, tungsten, molybdenum, or rhodium, and being in contact with an acid electrolyte, and contacting an oxidizer electrode of the cell with an oxidizer, the oxidizer electrode also being in contact with the electrolyte.

2. A process according to claim 1 wherein the fuel electrode comprises a supporting substrate with the alloy thereon.

3. A process according to claim 2 wherein the electrodes are gas pervious and the fuel is in gaseous phase.

4. A process according to claim 1 wherein the cell is operated at a temperature of 50°–300° C.

5. A process according to claim 1 wherein the ternary component is gold.

6. A process according to claim 1 wherein the ternary component is rhenium.

References Cited

UNITED STATES PATENTS

| | | |
|---|---|---|
| 2,335,707 | 11/1943 | Streicher. |
| 2,392,944 | 1/1946 | Pfeil. |
| 2,406,172 | 8/1946 | Smithells. |
| 3,116,170 | 12/1963 | Williams et al. _____ 136—86 |
| 3,261,716 | 7/1966 | Robbie, et al. _____ 136—86 |
| 3,275,476 | 9/1966 | Rightmere et al. _____ 136—86 |
| 3,323,902 | 6/1967 | Kroll. |

OTHER REFERENCES

Chem. Abs. 5752, vol. 56, March 1962.

ALLEN B. CURTIS, Primary Examiner

U.S. Cl. X.R.

136—120; 75—172